United States Patent

[11] 3,611,329

[72] Inventors John Edmund Lee Stevenage; Norman Nathan Truman, Enfield, both of England
[21] Appl. No. 781,111
[22] Filed Dec. 4, 1968
[45] Patented Oct. 5, 1971
[73] Assignee International Computers Limited London, England
[32] Priority Dec. 6, 1967
[33] Great Britain
[31] 55516/67

[54] LONGITUDINAL DIGITAL RECORDING WITH PERPENDICULAR DC BIAS
3 Claims, 2 Drawing Figs.

[52] U.S. Cl. 340/174.1 F, 179/100.2 C
[51] Int. Cl. G11b 5/22
[50] Field of Search 179/100.2 C, 100.2 CF, 100.2 K; 340/174.1 F; 346/74 MC

[56] References Cited

UNITED STATES PATENTS

| | | | |
|---|---|---|---|
| 2,628,285 | 2/1953 | Camras | 179/100.2 |
| 2,675,429 | 4/1954 | Rohling | 179/100.2 |
| 2,810,020 | 10/1957 | Schwarz et al. | 179/100.2 |
| 2,854,524 | 9/1958 | Went et al. | 179/100.2 |
| 2,932,697 | 4/1960 | Bogen et al. | 179/100.2 |
| 3,497,633 | 2/1970 | Rankin | 179/100.2 |
| 3,370,132 | 2/1968 | Flanders | 340/174.1 |

*Primary Examiner*—Bernard Konick
*Assistant Examiner*—Robert S. Tupper
*Attorney*—Hane & Baxley

ABSTRACT: A digital information recording apparatus is disclosed in which a high-coercivity planar recording member is moved across a gap between pole-pieces of a recording head. A first winding is energized to produce a varying magnetic field, representative of the digital information to be recorded, across the recording gap. A second winding is energized to produce a steady DC magnetic bias field at a substantial angle to the surface of the recording member such that the digital information is recorded in the presence of the steady DC magnetic bias field. In a second embodiment, one pole-piece is common to the varying field representative of the digital information to be recorded and the steady DC magnetic bias field.

INVENTORS
JOHN EDMUND LEE
NORMAN NATHAN TRUMAN
BY Hane and Baxley
ATTORNEYS

LONGITUDINAL DIGITAL RECORDING WITH PERPENDICULAR DC BIAS

BACKGROUND OF THE INVENTION

The present invention relates to the recording of information on a moveable magnetic recording member. In particular, a high-coercivity, planar recording member is employed.

It has previously been proposed to record information represented by electrical signals on magnetic recording members by applying the signals to a recording head having a recording gap while a recording member is moved relative to the head. The recording member may be, for example, a tape or disc coated with a magnetizable oxide layer, and the member is moved past the gap in the head. The electrical signals applied to the head produce a varying magnetic field at the gap which acts upon the magnetizable coating to produce a remanent magnetic pattern therein representative of the applied signals. The information so recorded is subsequently read off the magnetic member by passing the member across the gap of a reading head, the remanent magnetic pattern then acting on the reading head to generate electrical signals which represent the recorded information.

The need to record large amounts of information has led to the requirements that the packing density of information along the magnetic recording member be increased, and to this end the frequency of information items applied to the recording head has been increased. The use of oxide-coated members has been found to restrict the density of signals that may satisfactorily be recorded and it is desirable, in order to achieve greater recording densities, to use high-coercivity magnetic films for recording purposes, such as cobalt films, for example. However, in order to record satisfactorily upon such material it has been found necessary to use relatively high recording currents to energize the recording heads, and difficulty is experienced in controlling the generation and application of such high driving currents at the required high frequencies.

Also, it has been commonly found in prior art magnetic recording devices that the recording member is insufficiently magnetized by magnetic fields representative of information to be recorded. In order to effect a more complete magnetization of particular areas of a recording member, it has been proposed to provide an alternating bias field, usually at a substantial angle to a recording member, such that the combined effect of a recording field and alternating bias field is sufficient to saturate an area of the recording member near the recording gap. However, as the alternating bias field is generally of a frequency greater than the highest frequency of information-bearing signals to be recorded, problems in controlling the frequency and magnitude of such signals have been encountered. Also, unless the positioning of such alternating fields is accurately controlled, erasure of properly recorded information may result.

SUMMARY

According to the present invention, a method for recording information on a movable high-coercivity planar recording member includes the steps of moving the member past a pair of pole-pieces of a recording head separated by a recording gap; energizing a first winding to produce a varying magnetic field across the recording gap, the varying field representing information to be recorded; and energizing a second winding to produce a steady magnetic bias field at a substantial angle to the surface of the recording member at the recording gap such that information is recorded in the presence of the steady magnetic bias field.

As a result of maintaining the steady magnetic bias field at least as long as information is recorded and over an area at least as great as that on which the varying field is employed, it has been found that the driving current required to switch the state of high-coercivity planar magnetic recording member has been substantially reduced. Such a reduction in required driving current has the consequential advantage of allowing the use of less complex and less expensive driving circuitry, particularly at high frequencies. Thus, packing densities of information recorded on various recording members is substantially increased.

BRIEF DESCRIPTION OF THE DRAWING

Two embodiments of the invention will now be described with reference to the accompanying drawing, in which.

DESCRIPTION OF THE PREFERRED EMBODIMENTS

Figures 1, 2:
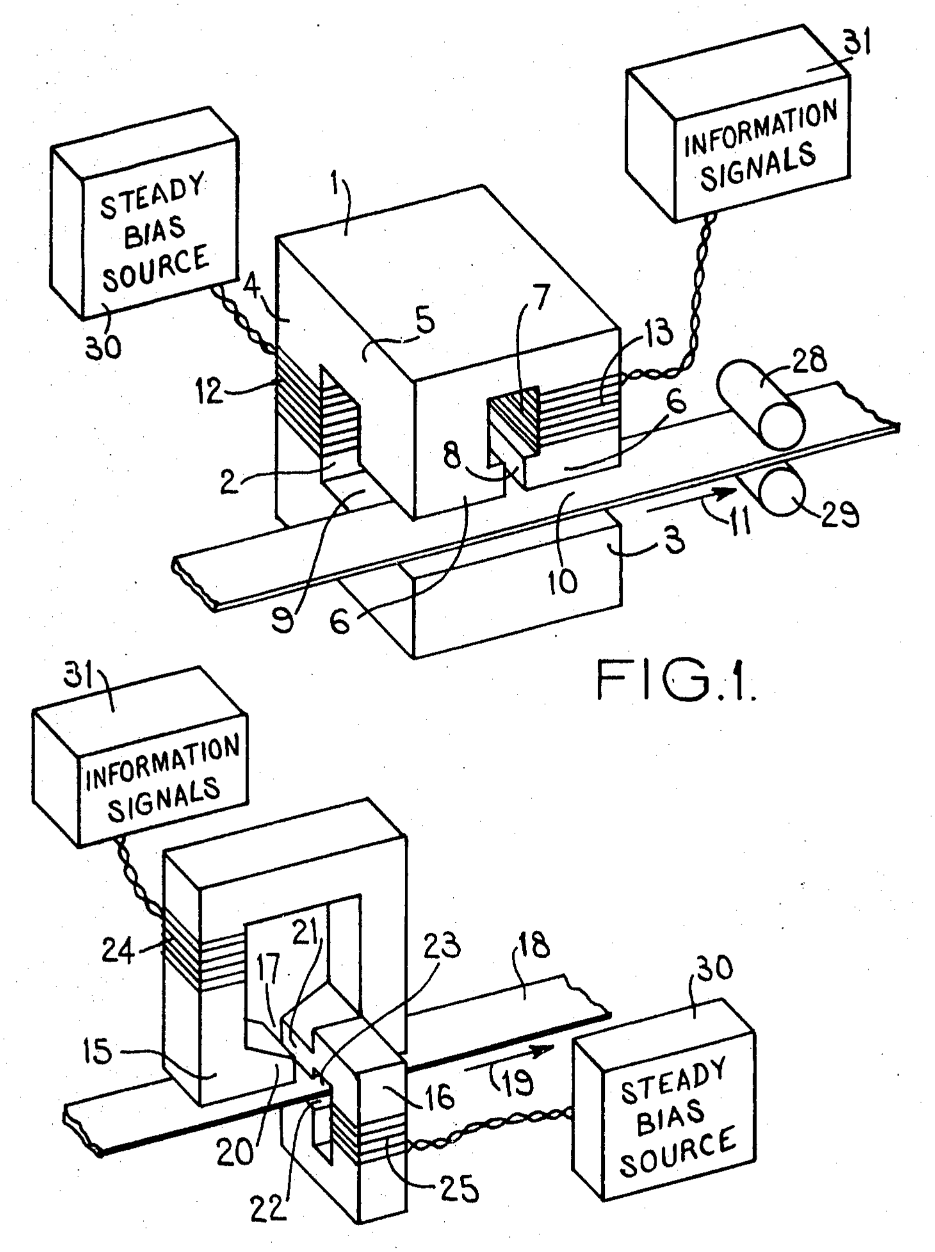
FIG. 1 is a schematic perspective view of a magnetic recording head.
FIG. 2 is a schematic perspective view of an alternative form of recording head.

Referring now to FIG. 1, a recording head consists of a ferrite block 1 having an L-shaped aperture 2 therein. As shown in the drawing the aperture so divides the block 1 that a lower horizontal portion 3 is attached at one end to a vertical portion 4. A top portion 5 is formed projecting from the vertical portion 4 over the lower portion 3, and the top portion 5 has two depending portions 6 separated by a generally T-shaped aperture 7. The two portions 6 are aligned with each other and are separated by a gap 8 formed by the stem of the T-shaped aperture 7. The portions 6 thus form the pole-pieces of a recording head separated by the recording gap 8.

Both pole-pieces 6 are aligned with, but spaced apart from, the free end of the lower portion 3 of the block. The space 9 between the portion 3 and the pole-pieces 6 is in the form of a slot, and an elongate recording member 10 is passed freely in its longitudinal direction through the slot 9, for example, in the direction of arrow 11. The recording member 10 is a tape carrying a high-coercivity magnetic material, such as a cobalt film. A drive capstan 29 is mounted immediately below and in contact with recording member 10. Similarly, an idler roller 28 is mounted immediately above and in contact with recording member 10. Energization of capstan 29 (by means not shown) will result in rotation of both capstan 29 and idler roller 28 as well as movement of recording member 10 in the direction indicated by arrow 11. Clearly, other means for moving a particular recording member may be employed. If, for example, the recording member is in the form of a disc coated with an appropriate magnetic material, the disc may be mounted on a shaft, which in turn may be energized by any convenient motive means.

A winding 12 is formed about the vertical portion 4 of the block 1 and a second winding 13 is formed about one of the pole-piece portions 6.

A steady bias source 30 is connected to winding 12 while a source of information signals 31 is connected to winding 13 with each source energizing respective windings. Clearly any suitable source of direct potential may be employed as a steady bias source 30 while source 31 may represent conventional means of supplying information signals to winding 13.

In the operation of the head, the winding 12 is energized by direct current to produce a steady magnetic field between the pole-pieces 6 and the bottom portion 3 of the block 1. This field passes substantially vertically across the slot 9, passing through the recording medium 10 in a direction substantially perpendicular to the plane of the medium as it passes through the recording head.

High-frequency electrical signals representative of elements of information to be recorded on the medium 10 as applied to the winding 13. Thus, during the recording of information on magnetic film carried by the medium 10 past the recording gap 8 by a varying magnetic field produced by the signals applied to the winding 13, a steady perpendicular biassing magnetic field is applied to the magnetic film by the energization of the winding 12.

It has been found that using the biassing field in this way substantially reduces the drive current which would otherwise be required to switch the magnetic film. Because the drive current applied to the winding 13 is reduced in this way, the complexity of the circuitry and the difficulty previously found to exist in providing electronic switching circuits to control the switching of high-drive currents at high frequencies is greatly reduced. Because it is possible, by using this method of recording in the presence of a steady biassing field, to switch the magnetic film at high repetition rates it has been found possible to increase greatly the permissible packing density of information recorded on the magnetic film carried by the recording medium 11.

It is believed that the process of recording utilized by the present invention relies upon the presence of a perpendicular component to aid the fringe fields from the pole-pieces 6 in switching the magnetic film, and in the present case this perpendicular component, which may be a steady component, is provided with energy from a different source from that which is required to provide the information-representing energy. Thus the energy required to be produced by the information signal source is considerably reduced, a reduction of approximately 80 percent from that which would otherwise be required having been recorded.

It will be realized that in practice the dimensions of the various parts shown in the drawing are extremely small. For example, the thickness of the medium 10 might be of the order of 0.0001 inches, the slot 9 might be approximately 0.002 inches and the recording gap might be 0.0001 inches long.

Since the purpose of the steady biassing field is to introduce a relatively large perpendicular component in the magnetic field acting on the recording medium, it will be realized that other forms of construction may be employed for the same purpose. For example, a conventional recording head may be provided and the recording medium may be passed across the head gap in the usual way. The steady biassing field in this case may be generated by, say, an external electromagnet, the entire recording head structure being located within the field from the magnet.

It will also be realized that although the biassing field is required to introduce a relatively large perpendicular component into the magnetic field acting on the recording medium at the point where recording is taking place it is not necessary that the biassing field itself should be exactly perpendicular to the plane of the recording medium at the recording gap. It is sufficient, for example, that the biassing field should be at a substantial angle to that plane.

FIG. 2 shows an alternative recording head structure in which the biassing field at the recording gap while not perpendicular to the recording member is nevertheless at a substantial angle to it. Referring now to FIG. 2, a recording head consists of two interlinked portions 15 and 16. The first portion 15 is in the form of a conventional recording head having a recording gap 17, between two pole-pieces 20 and 21, arranged transverse a longitudinal recording medium 18, which is moved past the gap 17 in the direction of arrow 19. A winding 24 is provided on the portion 15 to carry the high-frequency information-representing signal.

The second portion 16 of the recording head forms a further gapped head and is oriented with respect to the portion 15 so that the recording medium 18 passes through the gap 23 of the portion 16. The gap 17 is bounded by pole-pieces 21 and 22 and it is to be noted that the pole-piece 21 is common to both portions 15 and 16 of the recording head. Thus the pole-piece 22 is not, in this case opposite the recording gap 17 but is slightly displaced from the gap 17 in the direction of movement of the recording medium 18. A winding 25 is provided on the portion 16 of the recording head for energization by an auxiliary biassing source of electrical energy. The biassing field in this case, although not perpendicular to the plane of the recording medium at the recording gap, is nevertheless at a substantial angle to the plane in the area of the gap. Also, as in FIG. 1, a steady bias source 30 of direct potential is connected to energize winding 25 while a source of information signals 31 is connected to energize winding 24.

In operation, the recording head of FIG. 2 is connected as described with reference to the head of FIG. 1, the information-representing signals being applied to the winding 24 to produce a varying magnetic field at the recording gap 17, while a steady biassing field is produced at the gap 23 by DC energization of the winding 25. It will be appreciated that in this case the biassing field produced by portion 16 of the recording head at the recording gap 17 is a fringe field from the pole-pieces 21 and 22 and is at a substantial angle to the plane of the recording medium 18.

While the foregoing description has been concerned with an elongate recording medium, it will be realized that the present invention may be used with other forms of recording media, and as magnetic recording discs. Furthermore, the recording head may be of other material than ferrite, for example a mu-metal head may be used.

We claim:

1. A method of recording digital information on a moveable high-coercivity planar magnetizable member including the steps of moving said member across a recording gap between two pole-pieces of a recording head, energizing a first winding to produce a varying magnetic field across the gap substantially parallel to and in the plane of the magnetizable member, said varying magnetic field representing digital information to be recorded on said magnetizable member, and energizing a second winding simultaneously with energization of said first winding to produce a steady DC magnetic bias field substantially perpendicular to the surface of said magnetizable member at the recording gap between said pole-pieces such that information is recorded on said magnetizable member in the presence of said steady DC bias field.

2. A method of recording information on a movable high-coercivity planar magnetizable member as claimed in claim 1 in which said steady DC magnetic bias field is maintained for longer than said first winding is energized by signals to be recorded on said magnetizable member.

3. Apparatus for recording digital information on a movable, high-coercivity planar magnetizable member including a recording head having first and second pole-pieces separated by a gap, said first and second pole-pieces being positioned on one side of said magnetizable member, means to move said magnetizable member across said gap, the recording head having a third pole-piece positioned on the other side of said magnetizable member and underlying said gap, a first winding, means to energize said first winding to produce a varying magnetic field representative of said digital information, said variable magnetic field being produced across said gap substantially parallel to and in the plane of said magnetizable member, a second winding, and means to energize said second winding simultaneously with energization of said first winding to produce a steady DC magnetic bias field extending from said first and second pole-pieces through said magnetizable member to said third pole-piece in a direction substantially perpendicular to the surface of said magnetizable member at said recording gap and over at least that area of said magnetizable member onto which said varying magnetic field is simultaneously applied.